ELECTRONIC COUNTER

Filed July 1, 1949 11 Sheets-Sheet 1

INVENTOR.
JOHN C. MANLEY

BY

J. Pierre Kolisch
ATTORNEY.

July 26, 1955 J. C. MANLEY 2,714,180

ELECTRONIC COUNTER

Filed July 1, 1949 11 Sheets-Sheet 2

INVENTOR.
JOHN C. MANLEY

BY

J. Preie Kolisch
ATTORNEY

INVENTOR.
JOHN C. MANLEY

BY

J. Pierre Kolisch
ATTORNEY.

INVENTOR.
JOHN C. MANLEY
BY
J. Pierce Kolisch
ATTORNEY.

July 26, 1955 J. C. MANLEY 2,714,180

ELECTRONIC COUNTER

Filed July 1, 1949 11 Sheets-Sheet 5

INVENTOR.
JOHN C. MANLEY

BY

J. Pierre Kolisch
ATTORNEY.

July 26, 1955 — J. C. MANLEY — 2,714,180

ELECTRONIC COUNTER

Filed July 1, 1949 — 11 Sheets-Sheet 6

INVENTOR.
JOHN C. MANLEY
BY [signature]
ATTORNEY

July 26, 1955 J. C. MANLEY 2,714,180

ELECTRONIC COUNTER

Filed July 1, 1949 11 Sheets-Sheet 7

FIRST PREDETER-MINING

INVENTOR.
JOHN C. MANLEY
BY
[signature]
ATTORNEY

INVENTOR.
JOHN C. MANLEY
BY Pierre Kolisch
ATTORNEY

INVENTOR.
JOHN C. MANLEY
BY
J. Pierre Kolisch
ATTORNEY.

July 26, 1955 J. C. MANLEY 2,714,180

ELECTRONIC COUNTER

Filed July 1, 1949 11 Sheets-Sheet 10

INVENTOR.
JOHN C. MANLEY
BY
ATTORNEY

July 26, 1955 J. C. MANLEY 2,714,180

ELECTRONIC COUNTER

Filed July 1, 1949 11 Sheets-Sheet 11

INVENTOR.
JOHN C. MANLEY
BY [signature]
ATTORNEY

United States Patent Office 2,714,180

Patented July 26, 1955

2,714,180

ELECTRONIC COUNTER

John C. Manley, Barrington, R. I., assignor, by mesne assignments, to Reconstruction Finance Corporation, Boston, Mass., a corporation of the United States Application July 1, 1949, Serial No. 102,582

32 Claims. (Cl. 315—166)

This invention relates to new and useful improvements in impulse counting devices employing discharge tubes.

The main object of the invention is to devise a counter in which instead of the complex triodes, tetrodes, pentodes, etc., only diodes of the cold cathode type are used in circuit combinations comprising unidirectional devices, such as rectifiers, and impedances, such as resistors.

According to an object of the present invention, the circuit is so arranged that by a simple adjustment, the device can be used in either direction, i. e., to add pulses to one another, or to subtract pulses from any number that may have been registered in the counter. Heretofore, complex circuit arrangements were required to change a device over from adding to subtracting or vice versa.

According to another object of the invention the counter can be readily made receptive to pulses received directly from a suitable input circuit. Furthermore, the circuits may be readily interconnected into a system employing a plurality of counters, with or without the employment of electronic devices in coupling one counter to another. The pulses may be entered by the simplest kind of switching device, by a numerical keyboard or other digit selector, by some moving part of a machine, by a photoelectric cell, or by an electronic tube such as a thyratron. The counter may be employed to count a single series or numerical order of impulses, and preferably make some record of impulses received, or it may be used as part of a system in which a plurality of counters are employed, each representing a different order of a numerical designation with means for transferring, or carrying from one order into another. For instance, there may be one counter for the units, a second counter for the tens pulses and into which one impulse is transferred from the units counter after its complete operation, a hundreds counter for the hundreds pulses and into which the tens counter transfers one pulse after it has received ten pulses, etc., up to any number of counters that one may desire to couple together.

Another feature of the invention has to do with the resetting to zero of the device. Means are provided for presetting one or a plurality of orders of a counting system into any predetermined position, each order being controlled independently of any of the other orders. Means are provided for predetermining the resetting to zero of the device.

The tubes that are preferred for the purposes of the invention are of the cold cathode diode construction type having a firing voltage greater than their operating and extinction voltages. Heretofore, hot cathode devices were preferred for electronic counters because they were more nearly uniform even though it was known that cold cathode tubes had a lower initial cost, lower maintenance, relatively longer life, and did not need heater current. Cold cathode tubes use less current and dissipate less heat than hot cathode type devices and therefore they are ideally suited for counters which must be enclosed within a small space and may have to be used in places where increasing the ambient temperature would be objectionable. Another advantage of the cold cathode tube is that it will light up so as to give a clear indication of the number of pulses entered, whereas the operation of tubes of the hot cathode type is not easily seen and requires the employment of a special indicator or readout device.

The unidirectional devices may be of any type, though I have found rectifiers employing germanium crystals most suitable for the present purpose because of their low forward and high inverse resistance to the flow of current. The condensers are stock paper condensers such as are employed in the radio, telephone and telegraph arts. In fact, all the component parts are standard in radio, telephone and telegraph techniques. The thyratrons which will be described later are of the 2D21 type and are also standard in the radio art.

In the description of the invention about to be given current flow will be assumed to be from positive to negative, that is, from a positive bus through the tubes and associated elements to a negative or grounded bus.

There follows an explanation of the invention in greater detail with reference to the drawings representing a few preferred embodiments and in which:

Fig. 1 shows a basic adding counter circuit;

Fig. 1*a* is explanatory of Fig. 1 and illustrates the voltage variations in various portions of the circuit of Fig. 1;

Figure 14:
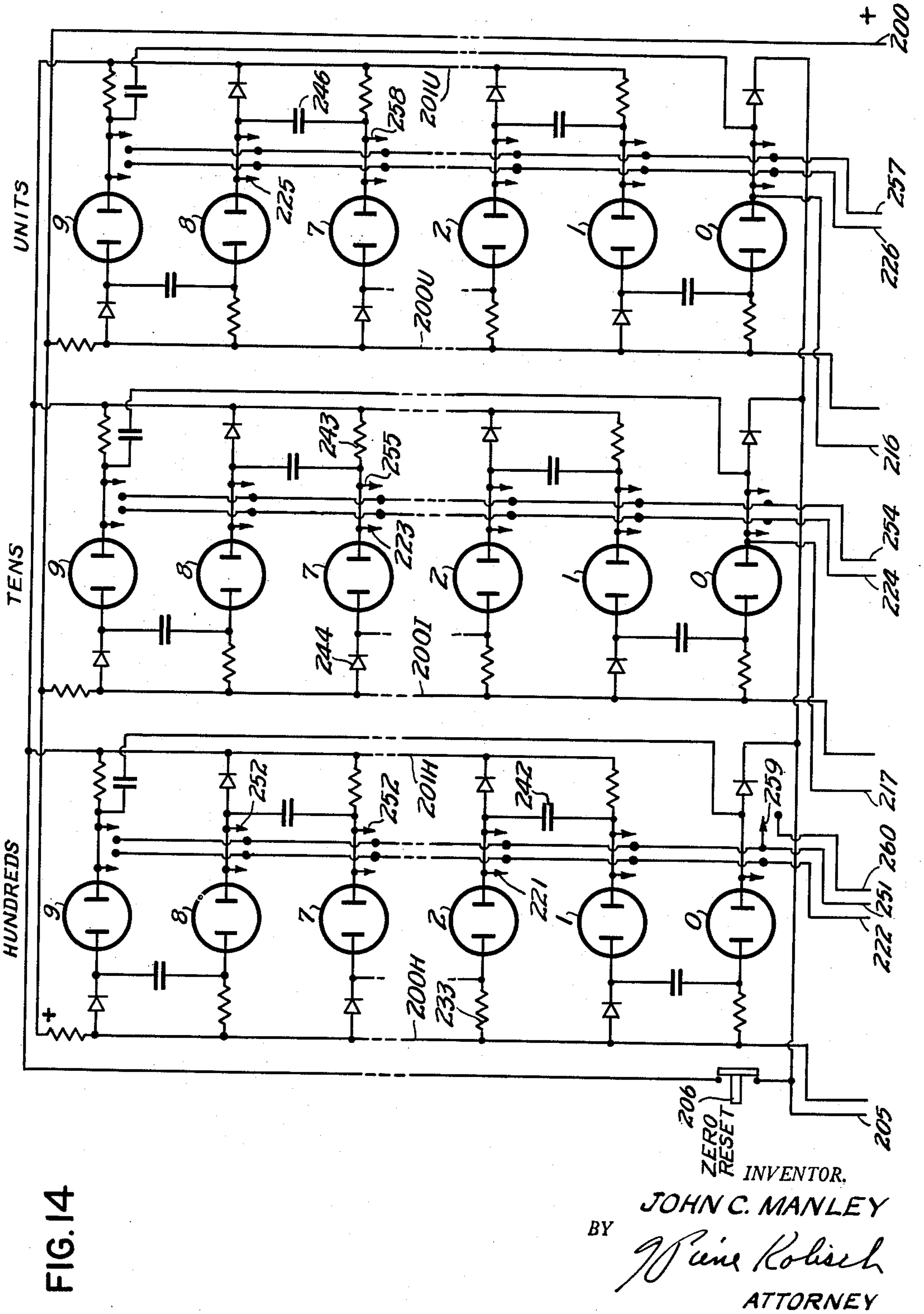
Figure 14A:
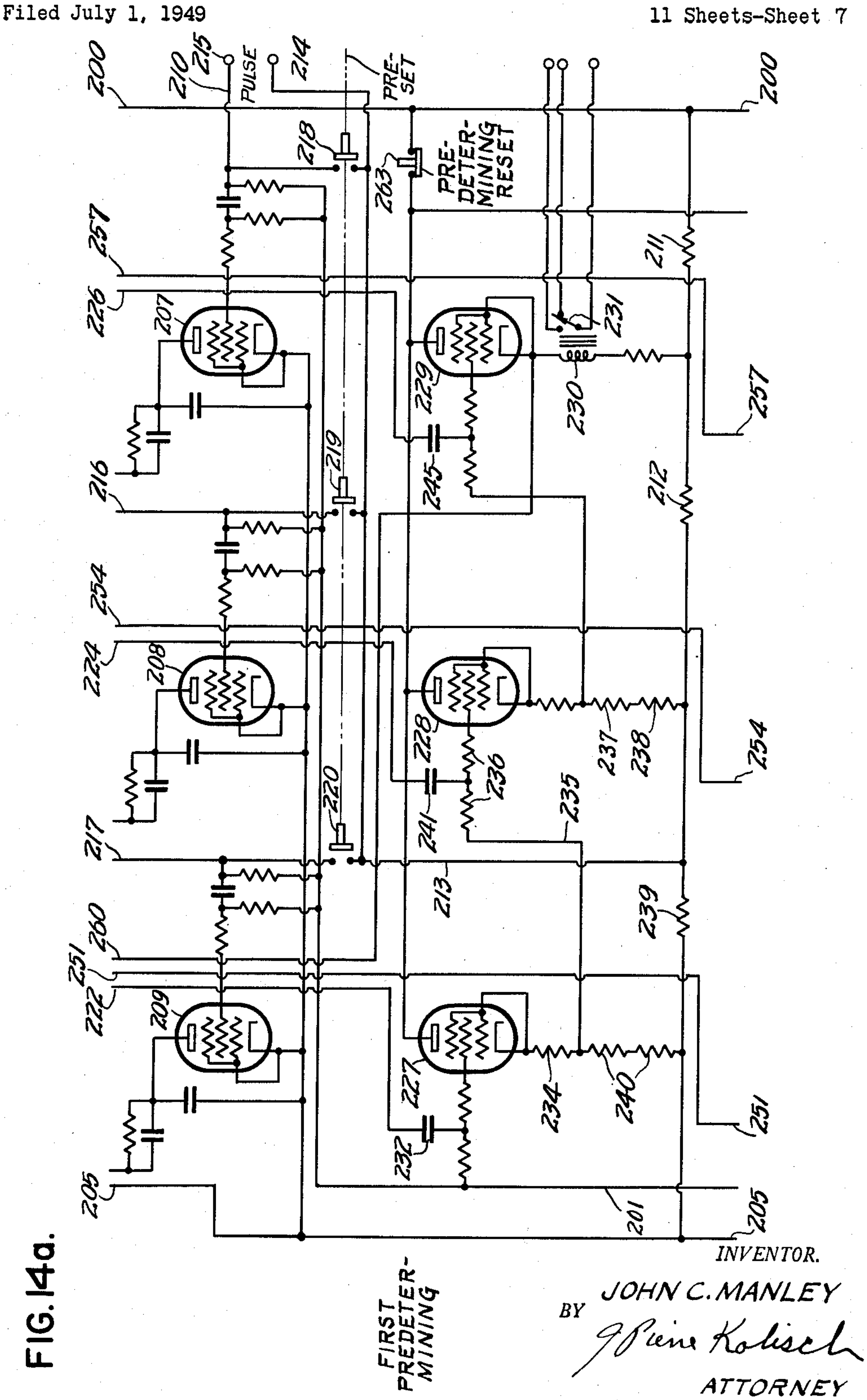
Figure 14B:
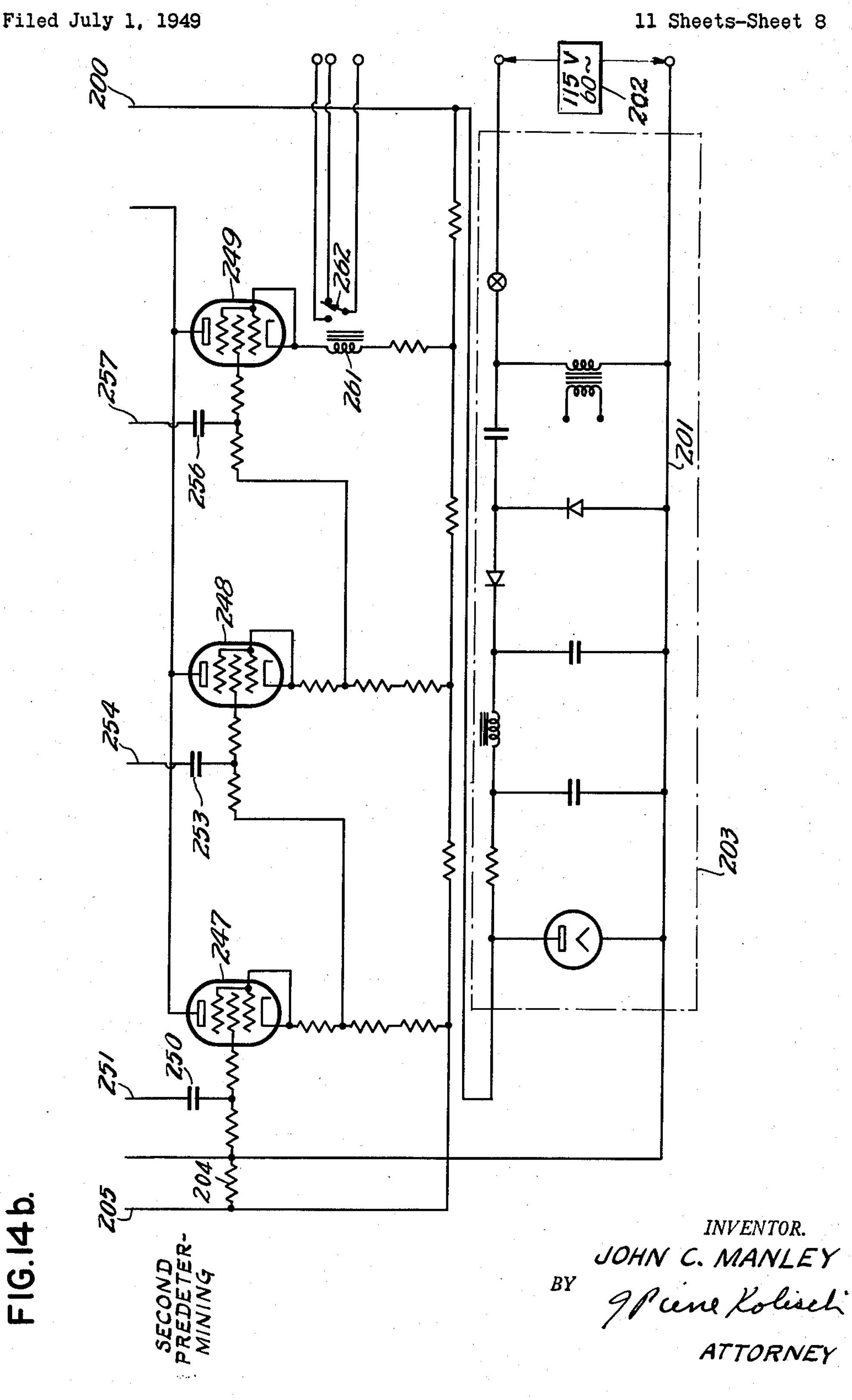
Figure 15:
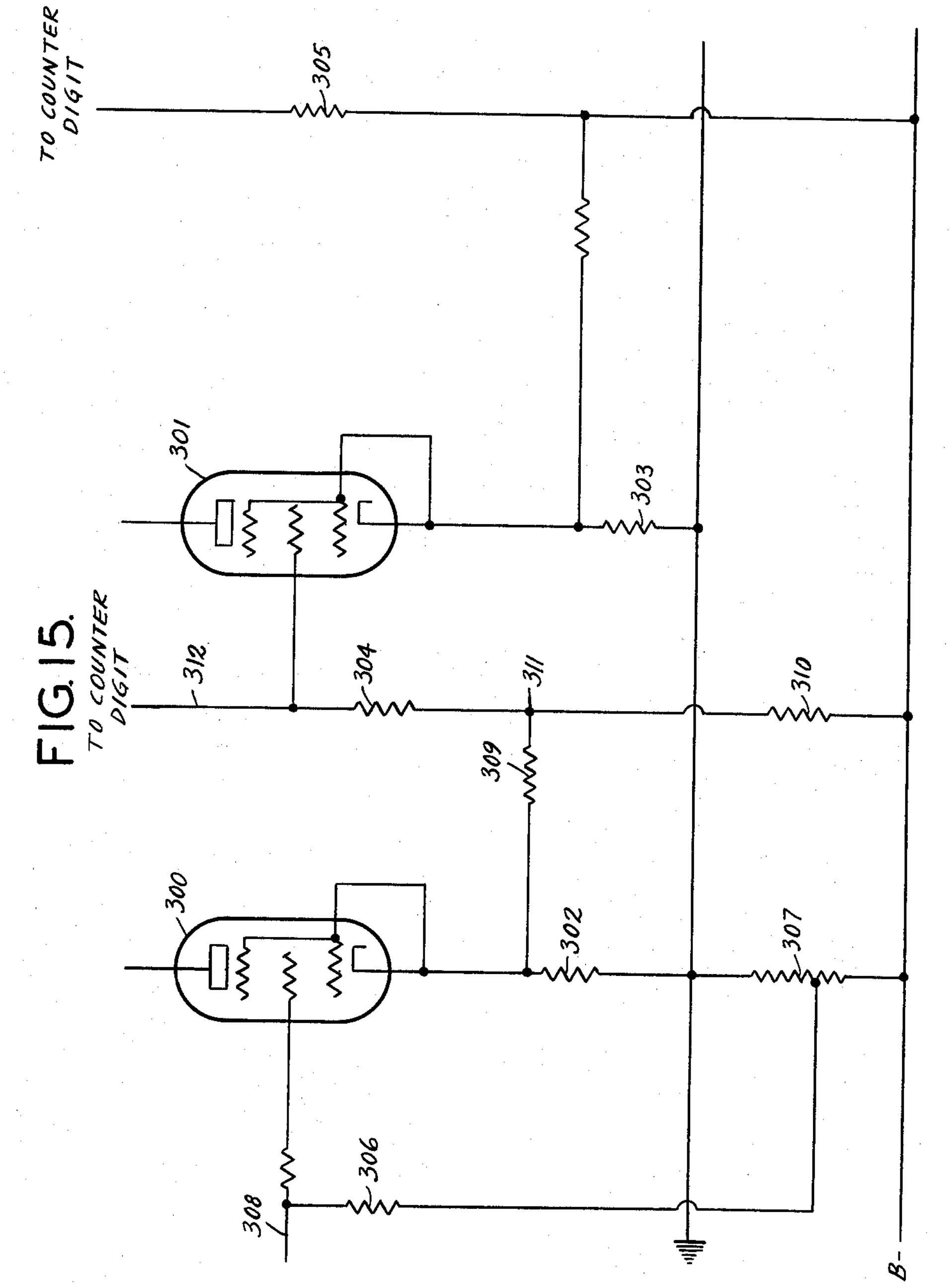
Figure 16:
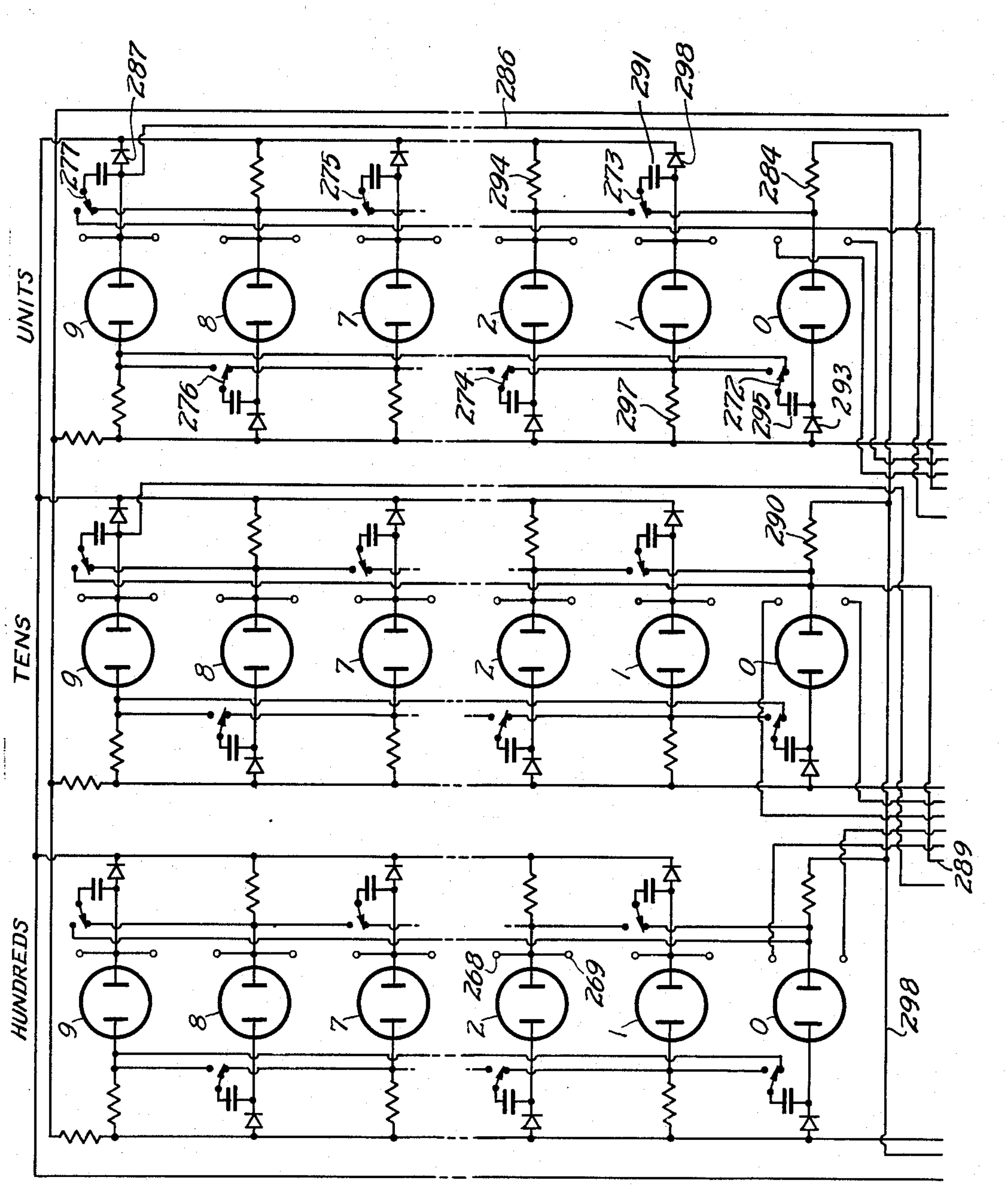
Figure 16A:
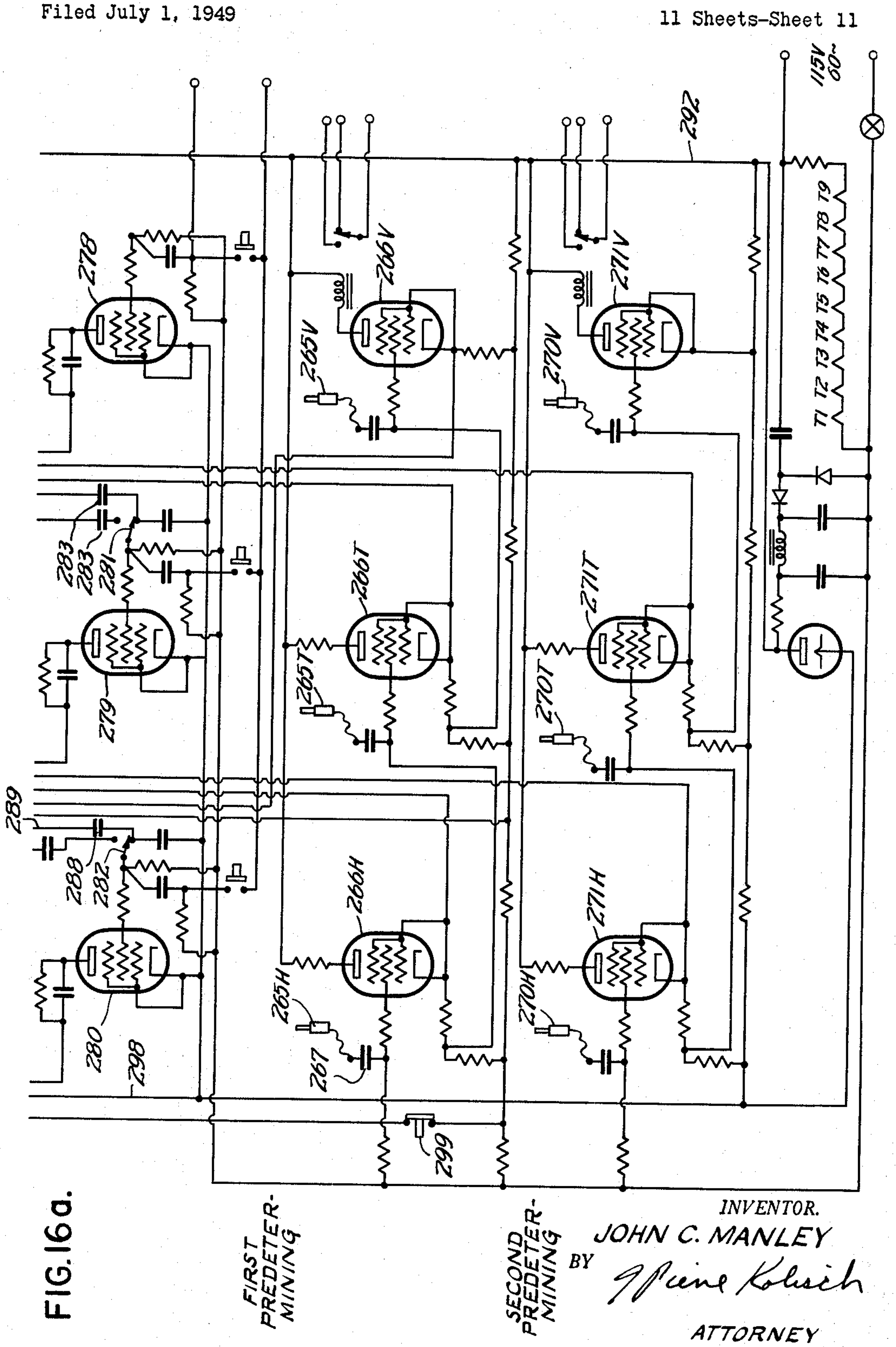

Figs. 14, 14*a*, 14*b* diagrammatically illustrate a counting system having three orders, perdetermining, and triggered by thyratrons;

Fig. 15 shows an alternative manner of biasing the predetermining thyratrons of Fig. 14*a*; and Figs. 16, 16*a* are similar to Figs. 14–14*b* except that the system is operable for adding or subtracting.

Figure 1:
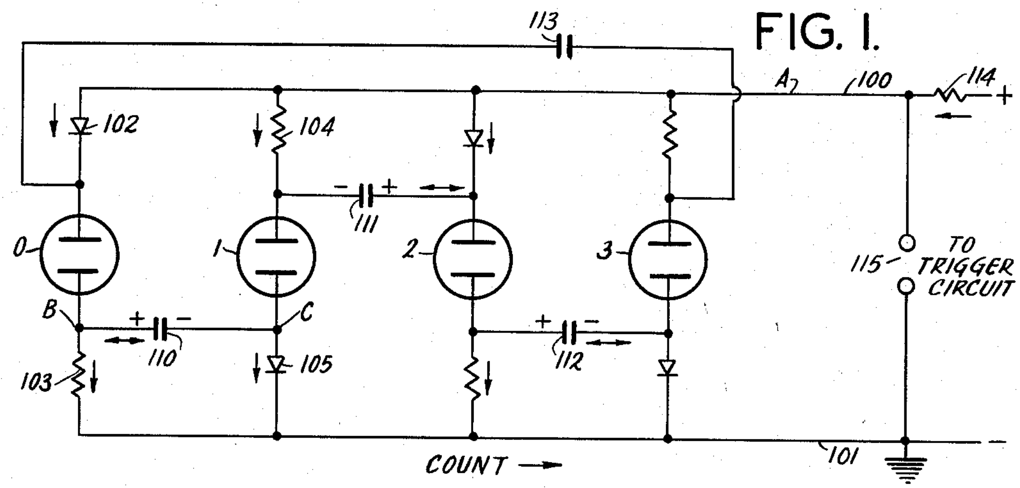

Referring now to Fig. 1, the counter may consist of as many gas filled diodes as are required to count a series or order of pulses. In most decimal type counters ten tubes would be normal and ten diodes 0 to 9 would be provided. For the purposes of illustration I have shown a counter having only four diodes 0 to 3. Any suitable diode construction may be employed. I have obtained good results with neon tubes designated as NE48 and NE16 rated at a ¼ watt. These tubes ignite on from 75 to 85 volts, extinguish below 55 volts, and have an operating voltage of about 55 volts. With tubes having different characteristics, the circuit might have to be rearranged.

Tubes 0–3 making up the counter are connected between two conductors 100 and 101 constituting the positive and negative bus bars to the current source. The tubes are bridged across these conductors via resistors and rectifiers. The 0 tube is bridged across the conductors 100 and 101 via a rectifier 102 and a resistor 103. Similarly, the 1 tube has a resistor 104 and a rectifier 105 in its bridge circuit, and each and every one of the other tubes has a rectifier and a resistor connected in series therewith across conductors 100, 101. The 0 tube has the rectifier 102 on the side of the conductor 100 and the resistor on the side of the conductor 101. The 1 tube has the rectifier on the side of the conductor 101 and the resistor on the side of the conductor 100. The tube 2 is connected as the 0 tube, the 3 tube as the 1 tube. The rectifiers are poled so that the current may flow with minimum impedance from the positive side of the circuit toward the negative as indicated by the small arrows adjacent the rectifiers.

Condensers 110, 111, 112 and 113 are coupling capacitors between the tubes and, as will be explained, precondition a succeeding tube to start upon the receipt of an additional triggering pulse. Condenser 113 serves as the return coupling between the last and first tubes so that a counting ring is maintained.

Resistor 114 is a current limiting impedance during the triggering operation and will be explained later.

The terminals 115 are normally connected to one of the triggering means, Figs. 8–12 which will be described later. In order to comprehend the basic counter circuit it is not necessary at this point to understand the operation of any of the triggering means. All that need be borne in mind is that any triggering device imposes a momentary load on resistor 114 of a magnitude sufficient to lower the positive bus voltage to a point below the extinguishing voltage of any of the tubes in the counter circuit.

In circuits employing commercial tubes of the type described, the resistor 103 should have a value of 15,000 to 30,000 ohms, the current supply across 100—101 being at approximately 150 volts. Resistor 114 has a value of approximately 60,000 ohms which is such that with the given constant source voltage and just one tube lit, conductor 100 has a potential to ground of slightly less than the starting voltage of any lamp.

For reasons that will be clear from what follows, it will be assumed that the 3 tube became extinguished and triggered the 0 tube in a manner to be explained below. The 0 tube is fired on account of the rise in the voltage on the conductor 100 upon the extinguishing of the 3 tube and the charge that existed in condenser 113 connected between the 3 tube and the 0 tube. These two voltages together will produce across the 0 tube a potential in excess of 70 volts, sufficient to fire the 0 tube. The normal voltage on the bus bar 100 is just below the firing voltage of the tubes but will be boosted by the voltage stored in condenser 113 to the firing potential. The condenser 105 in the present example has a value of .03 microfarad, just as all the other condensers 110, 111, 112 have, which link adjacent tubes of the system.

The tube 0 is lighted and all the other tubes of the counter are extinguished. Let us now assume that an additional pulse is received at 115 from the triggering means to lower the voltage on conductor 100 below 55 volts (operating voltage of tubes) and therefore extinguish tube 0. Assuming that conductor 100 is at 73 volts, the difference between it and the operating voltage of the tubes (55 volts), is 18 volts and appears across resistor 103. This means that point B is 18 volts more positive than conductor 101 so that a charge will be placed on condenser 110 from the 0 tube through the condenser and rectifier 105 to ground. When condenser 110 is fully charged it will have a potential across it equal to the drop in resistor 103, namely, 18 volts. With the extinguishment of 0 tube the voltage across resistor 103 disappears and condenser 110 discharges in a counter-clockwise direction through resistor 103, conductor 101 and rectifier 105.

The resistor 103 is of small ohmic value (15,000–30,000 ohms) compared to the inverse resistance of rectifier 105 (500,000 to 2,000,000 ohms) and therefore, the potential at point C becomes negative relative to conductor 101. In the meantime, because of the short duration of the triggering pulse, the conductor 100 has approached its steady potential of 73 volts. The additive effect of the recovering conductor voltage and the negative voltage at point C applies a sufficient voltage (in excess of 75 volts) across tube 1 to fire it. As was the situation with the 0 tube, the current load of the 1 tube causes an adequate drop across resistor 114 to prevent the other tubes from firing. 0 tube is kept from re-firing by the fact that point B during the discharge of condenser 110 is at a positive potential relative to conductor 101.

Figure 1A:
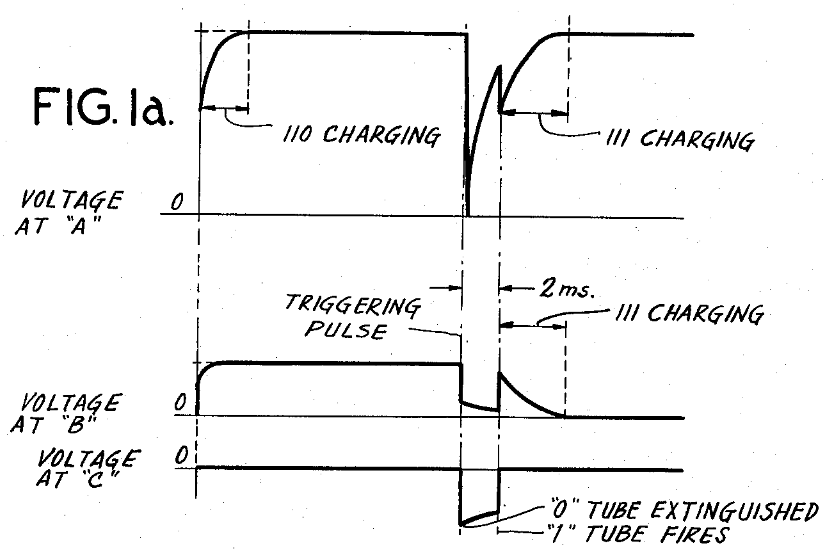

The voltage relationships at points A, B, C of Fig. 1 are graphically illustrated in Fig. 1*a*.

These operations continue as pulse after pulse is received until the 3 tube is lighted which then via condenser 113 will start the operation of the 0 tube as previously described. The ring can keep on operating indefinitely. We shall later describe how, upon the completion of each operation of the ring, a pulse may be transferred to another order of the device.

Figure 2:
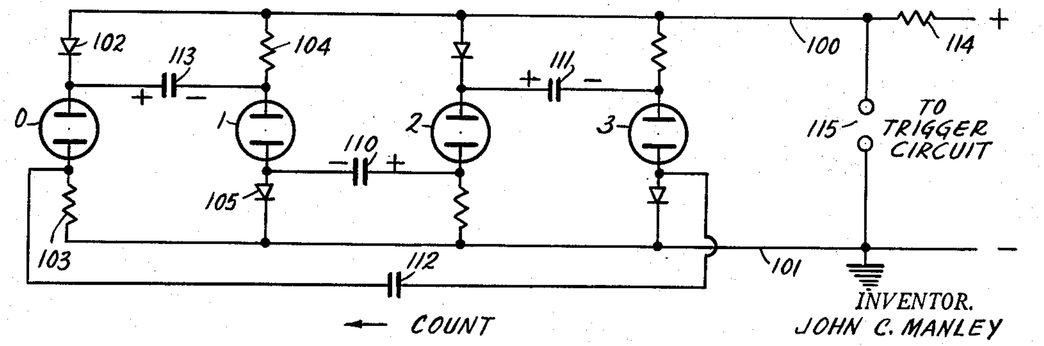
Fig. 2 shows a basic subtracting counter circuit.

As shown in Fig. 2, by changing the positions of the condensers 110, 111, 112, 113, so that their plus minus charges, which depend on the respective voltage drops across resistors 103, 104, etc., are reversed, the counter is made to work in the opposite direction as indicated by the arrow and will subtract rather than add.

Figure 3:
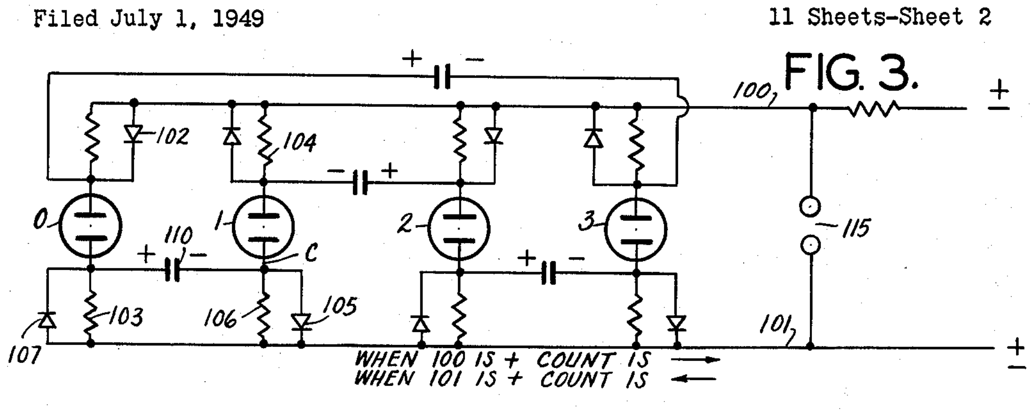
Fig. 3 shows a basic circuit for either addition or subtraction.

Fig. 3 is a combination of Figs. 1 and 2, in which the symmetry of component arrangements permits operating the counter in either direction, i. e. to add or subtract, simply by reversing the bus potential on conductors 100, 101. If the time interval of reversing the bus potential is short enough, the charge of any one of the respective coupling condensers 110–113 is sufficient to re-ignite the previously lighted tube and therefore, hold the count even though the tube is momentarily extinguished. This is possible because the symmetrical arrangement of the elements does not reverse the potential of the charged condenser when the bus voltages are reversed.

Referring to Fig. 3, it should be noted that approximately half the negative voltage at point C is available for firing of 1. Since condenser 110 is discharging through the relative low impedance of resistor 106 as against the high inverse impedance of rectifier 105 in Fig. 1, the discharge voltage of condenser 110 appears proportionately across the resistor-rectifier combinations 103, 107 and 106, 105. If the tubes have a large difference between the igniting and operating voltages there is no problem, since the difference in these two voltages always appears across the associated resistor-condenser combination of the lighted tube. As long as the half difference voltage appearing at C is sufficiently large to exceed the starting voltage of the tube, the counter will operate satisfactorily.

Figure 4:
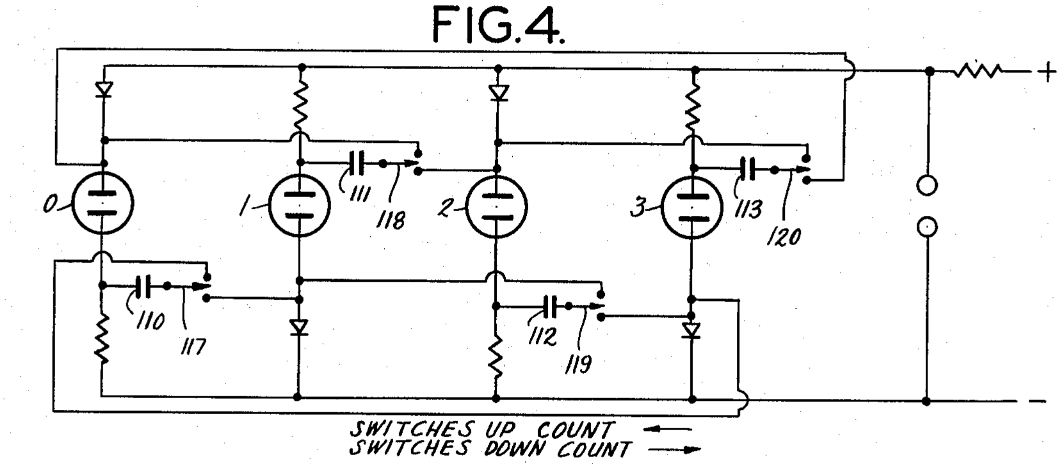
Figs. 4, 5 and 6 are variations of the basic circuits shown in Figs. 1 and 2 whereby addition or subtraction may be carried out by the operation of switches.

Fig. 4 shows a circuit in which the counter may be changed from adding to subtracting or vice versa without reversing the polarity of the buses. Double poled switches 117, 118, 119, 120, are provided and may be operated to alternatively connect the coupling condensers 110, 111, 112, 113 to the desired arrangement of elements for either addition or subtraction. If the switches 117, etc., are closed up, the device will act to subtract and if the switches are down the device will add.

Figure 5:
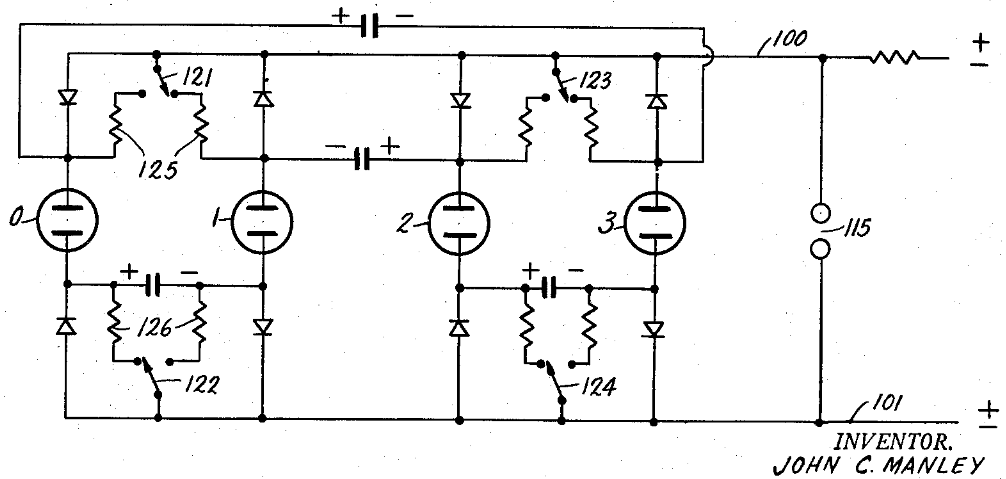
Figure 6:
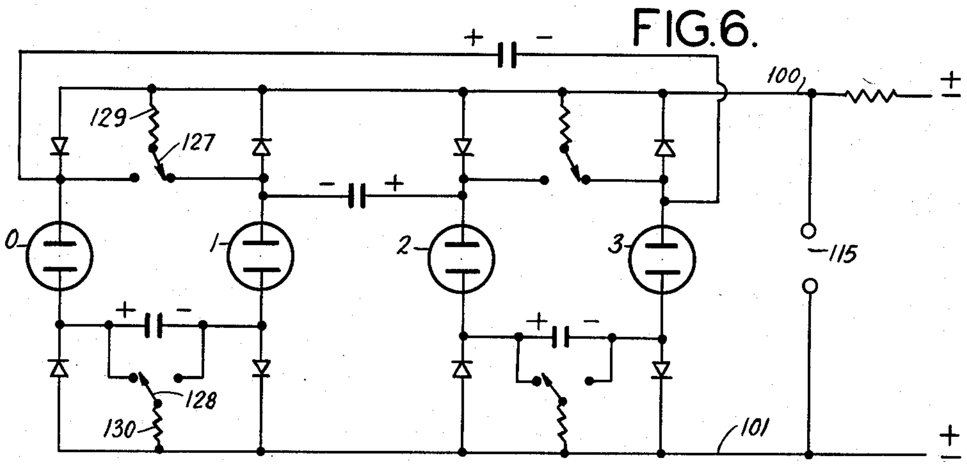

Figs. 5 and 6 show two other ways of employing the basic circuits shown in Figs. 1 and 2 either to add or subtract. In Fig. 4 double poled switches 121, 122, 123, 124 are provided between twin resistors 125, 126 (like resistors 103, 104, etc.) in each counting stage. Depending upon the polarity of conductors 100, 101 and the position of switches 121, 122, etc., the device will add or subtract. For instance, if conductor 100 is positive and the switches are closed as shown in Fig. 5, the device will add. If conductor 101 is positive and the switch is reversed from the indicated positions, the device will subtract. In Fig. 6, double pole switches 127, 128, etc., are asssociated with single resistors 129, 130, in each counting stage. Depending on the polarity of conductors 100, 101, the device will add or subtract. If conductor 100 is positive and the switches are closed as shown, the device will add. If conductor 101 is positive and the switches are reversed, the device will subtract.

Figure 7:
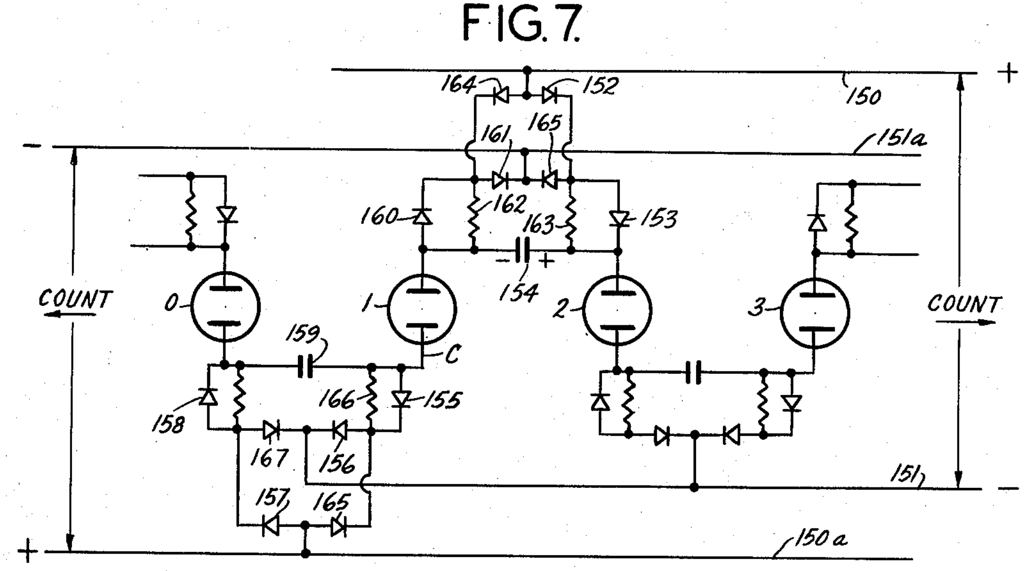
Fig. 7 shows an arrangement in which addition or subtraction may be carried out in the same circuit without the use of switches.

Fig. 7 shows a circuit arrangement adapted to add and subtract and in which the switching in and out of condensers and resistors is eliminated. Two different pairs of bus bars 150, 151 or 150A, 151A are provided. If it is desired to count from left to right, then the counter must be connected to the bus bars 150 and 151. The positive bus 150 is then connected via a rectifier 152 and a second similarly poled rectifier 153, condenser 154, the 1 tube, two similarly poled rectifiers, 155 and 156 to the negative bus 151. It will be noted that this connection is of the same configuration as the one shown in Fig. 1, whereby the count will proceed from left to right.

If the counter is switched to the buses 151A and 150A, then the positive bus 150A is connected via rectifiers 157, 158, a condenser 159, the 1 tube, two similarly poled rectifiers 160 and 161 with the negative bus 151A. This configuration is similar to the one shown in Fig. 2 whereby the count will proceed from right to left.

Resistors like 162, 163 are bridged across rectifiers like 160 and 153. Two additional rectifiers 164, 165 are provided in each unit to insure its symmetry. Each stage or unit, e. g. that of tube 1, has six rectifiers 164, 161, 160, 155, 156 and 165, and two resistors 162 and 166, one condenser 159 linking it with the lower or left-hand and one condenser 154 with the higher or right-hand tube. The connections to the different buses are between oppositely poled rectifiers of adjacent units. For instance, + bus 150 is connected between rectifier 164 of the 1 tube unit and rectifier 152 of the 2 tube unit, the − bus 151A between rectifier 161 of the 1 tube, and 165 of the 2 tube, − bus 151 between rectifier 156 of the 1 tube and 167 of the 0 tube, and + bus 150A between 157 of the 0 tube and 165 of the 1 tube. The path traced via 152, 153, 154 for the 1 tube cannot be paralleled via rectifier 164, because flow of current therethrough is blocked by rectifier 160. Similarly, 158 blocks off the 0 tube from − bus 151.

Circuits like the ones shown in Figs. 3 and 7 in which resistors are permanently bridged across associated rectifiers, obviate the necessity of switching.

The potential available for triggering the tubes will only be one-half of what would be available if switches were employed, because there is a loss via the resistors for the charge accumulated on the condensers. Therefore, twice as great a charge would have to be kept in the condensers, or tubes of much greater sensitivity would have to be provided. This makes uniformity of tubes of much greater importance than in circuits in which a switching arrangement is employed.

As previously mentioned triggering means for applying a pulse to depress the positive bus voltage, are connected at 115 to the counter circuits. Some of these triggering means will now be described.

Figure 8:
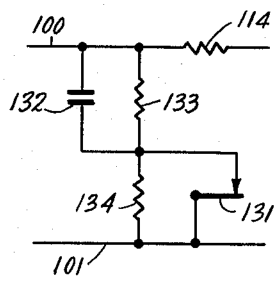
Figs. 8, 9, 10, 11, 12 show alternative triggering circuits for a counter.

Fig. 8 shows a mechanically or electrically operated switch or relay 131 bridging the condenser-resistor combination 132, 133 across conductors 100, 101. The switch is bridged by a resistor 134 having substantially the same value as resistor 133. Each operation of switch 131 will have as its effect the application of a pulse to the counter.

The function of resistor 134 bridged across contact 131 is to prevent the application of more than one pulse to the counter when the switch is operated at very high frequency, e. g. when the switch bounces. The interruption must be at a low enough frequency to indicate that an impulse was intended. The resistors 133, 134 and condenser 132 must be designed to permit the transmission of impulses only when sent at a predetermined frequency and not at much higher frequencies.

Figure 9:
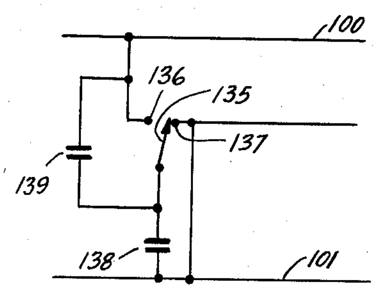

Another triggering arrangement is shown in Fig. 9 where a switch 135 may be provided with two contacts 136, 137. When the switch is placed in engagement with contact 136 it will bridge conductors 100 and 101 via a condenser 138 which corresponds to condenser 132 of Fig. 8 and apply a pulse in the input circuit. When the switch 135 is moved into engagement with contact 137, condenser 138 is permitted to discharge whereby the count is completed. Condenser 139 which is bridged across terminal 136 and switch 135, is designed to prevent the application of pulses above a predetermined frequency to the input circuit in case the switch bounces.

In general, the input circuit should have its prime components so proportioned as to prevent the application of pulses at any other frequencies than the predetermined frequency or band of frequencies.

In both Figs. 8 and 9 the closing of switches 131 or 137 in series with a condenser 132 or 138 across conductors 100, 101 causes a momentary load on resistor 114 such that the conductor voltage drops to theoretical zero and climbs back rapidly to its previous steady condition at a rate which is a function of the condenser capacity, source voltage, and the impedance of the associated resistors, all in accordance with accepted electrical engineering knowledge.

Figure 10:
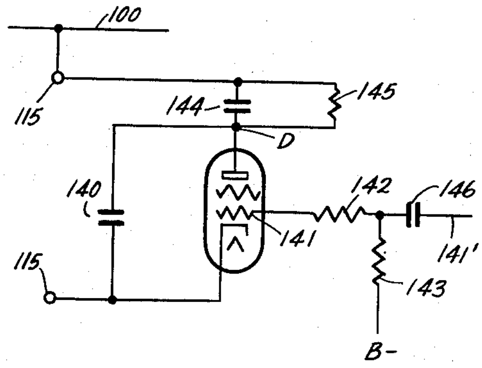

Fig. 10 shows a conventional grid controlled thyratron of the 2D21 type used as the triggering means to depress the bus voltage. The thyratron acts as a switch in series with a condenser 144 which when being charged lowers the bus potential below the extinction voltage of the tubes. Condenser 140 prevents self-oscillation of the thyratron. As long as grid 141 of the thyratron is maintained negative over resistors 142, 143 from a B− source, the thyratron will not conduct. By applying a positive voltage or pulse over conductor 141' the negative bias is overcome and the thyratron starts to conduct, whereupon condenser 144 is charged. A shunt resistor 145 discharges condenser 144 when the thyratron is not conducting. However, since a short time constant is required, resistor 145 is of sufficiently low value to keep the thyratron conducting even after removal of the positive pulse from its grid. The thyratron is extinguished when a succeeding tube in a counter is fired and the bus voltage drop and the capacitative reactance of condenser 144 combine to lower the voltage at point "D" below the extinguishing voltage of the thyratron. The thyratron is now ready for the next pulse over 141' which may be conveniently connected to any suitable source of positive voltage impulse, such as a digit in another counter. Coupling condenser 146 connected to grid 141 filters the two potential rises and prevents a double rise at D from giving a false count on a succeeding counter.

The thyratron triggering means is particularly suitable for intercounter triggering where the output of one counter is not sufficient to trigger another, or where the load of a second counter would interfere with the operation of the first counter. The pulses applied to the input or grid circuit of the thyratron may be received from another decade counter representing either a lower or a higher order of a numerical counting system, just as they may be received from any other source. Similarly, the point of connection between the 0 tube and the resistor 103 may be connected not only to the 1 tube of the decade counter shown in Fig. 1 via a condenser 110, but also to the input circuit of a thyratron controlling the input into another decade counter in the system.

Figure 11:
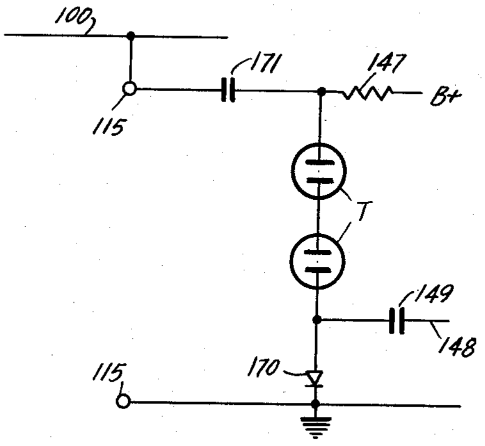
Figure 12:
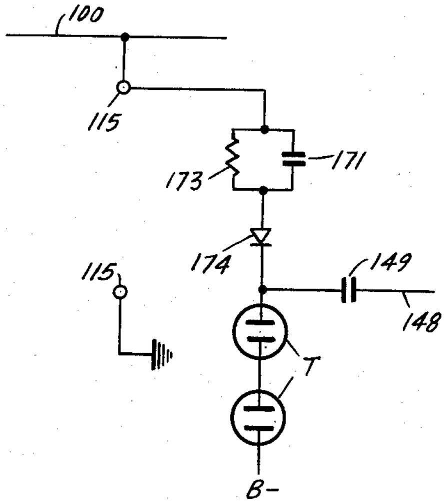

In Figs. 11 and 12 a preferred triggering means is illustrated which employs two series-connected neon tubes "T" similar to those used in the counter proper, rather than a mechanical switch or a thyratron. A single tube "T" may be employed as the switching means where neon tubes are available having a sufficient spread between firing and extinction voltages, i. e. firing—75 volts, extinction—30 volts.

In Fig. 10 the tubes "T" are series-connected through a resistor 147 to a positive B+ source of voltage which is less than the sum of the ignition voltages of the two tubes. The negative pulse required to fire tubes "T" comes over conductor 148 and through condenser 149. Rectifier 170 prevents a flow of current from ground to the source of negative pulses. Condenser 171 is a coupling capacitor to the counter conductor 100. The negative pulse over conductor 148 is sufficient to light tubes "T" and cause a voltage drop over resistor 147 which is transferred to the counter conductor 100 over coupling condenser 171. As in the case of thyratron triggering the value of resistor 147 is sufficiently low to keep the tubes lit once they have been fired and they are extinguished when the next number tube in the counter fires. This causes a sudden drop in voltage on conductor 100 and in addition the capacitative reactance of condenser 171 brings the voltage across tubes "T" below their extinction voltage. Tubes "T" are again ready for the next pulse over conductor 148.

At least two tubes "T" are connected in series because the operating voltage of any one lamp is not sufficiently low to pull the counter bus voltage low enough. The sum of the hypothetical firing voltages of tubes "T," 150 volts (75+75) minus the sum of the operating voltages, 110 (55+55) produces a difference voltage of 40 volts which is more than sufficient to pull the counter bus voltage down from 73 volts to below the extinction voltage (55 volts) of any tube in the counter.

The circuit of Fig. 12 is essentially the same as that of Fig. 11 except that a shunting resistor 173 connected around condenser 171 acts to discharge the condenser when tubes "T" are extinguished. A negative B− source of voltage to tubes "T" is substituted for the B+ source of Fig. 11. The firing of the tubes is controlled by a pulse over conductor 148 through condenser 149 as in Fig. 11. A rectifier 174 prevents current drain or loading of the impulse source.

Figure 13:
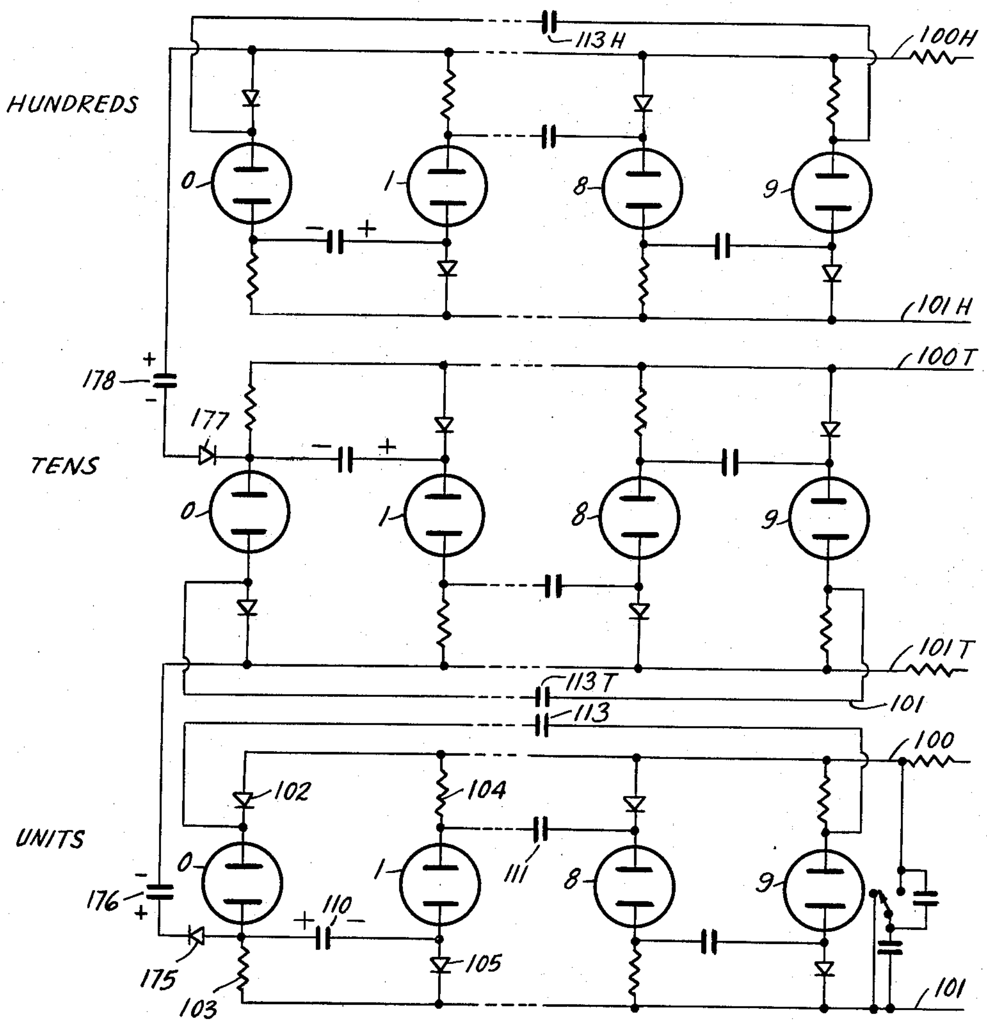
Fig. 13 is a diagrammatic illustration of an arrangement in which the fundamental circuit of Fig. 1 is employed in a counting system having interconnected units, tens and hundreds orders.

In Fig. 13 an arrangement of linking three decade counters of a counting system is shown in which the zero tubes in each decade have a lower starting and operating voltage than the other tubes in the decade. Let us assume for instance, that all the tubes 1–9 in a decade have an operating voltage of 55 volts and that the 0 tubes in all the decades have an operating voltage of 50 volts. Whenever the 0 tube of the units decade lights, whichever tube in the tens decade happens to be lighted must be extinguished and the next higher tube lighted. If the 0 tube in the units decade were like the others and had an operating voltage of 55 volts, then its lighting would produce a drop of only 15 volts across the associated resistor 103 and this would not be sufficient to pull the operating voltage of the lighted tube in the tens decade low enough to extinguish it. Since, however, the units tube 0 has a lower operating voltage than 55 volts, its lighting will cause a larger drop across the associated resistor 103, whereby the lighted tube in the tens decade will have its voltage reduced, not to 55 volts as would be the case under the previously assumed condition, but to a point below 50 volts which will insure the extinction of the lighted tube. Similarly, if the operating voltage of the tens 0 tube were lower than the operating voltage of the other tens tubes and lower than the operating voltage of the hundreds tubes 1–9, then the lighted one of the latter will be extinguished.

The 0 tubes in the different decades or orders must also differ from one another. If the tens 0 tube were identical with the units tube 0, then should the tens 0 tube become lighted while the units 0 tube is lighted, it would not become extinguished. Similarly, if the hundreds 0 tube were lighted when the tens 0 tube lights, then the hundreds 0 tube would not become extinguished if its extinguishing potential were identical with that of the tens 0 tube. However, according to the present invention, the tens 0 tube has a lower extinguishing potential than the units 0 tube, and the hundreds 0 tube has a lower extinguishing potential than the tens 0 tube. If the 0 tubes have substantially identical operating characteristics the counter would operate with only a narrow margin of accuracy.

Referring to Fig. 13 the units order corresponds to the counter diagrammatically illustrated in Fig. 1. The point of connection between the 0 tube of the units order and the resistor 103 is connected via a rectifier 175 and a condenser 176 with the grounded or zero potential conductor 101 of the tens order decade counter, designated as 101T. Condenser 176 becomes charged when the 0 tube of the units order lights, the charging of this condenser occurring simultaneously with the charging of the condenser 110 which connects the units 0 tube with the units 1 tube. This will cause the raising of the ground bus 101T of the tens order transiently to approximately 20 volts, just as the grounded bus 101 of the units order was transiently raised to approximately 20 volts.

Whichever tube of the tens order was lighted at this time, will go out because the voltage across it will be lowered below 55 volts. This tube will cause via its associated condenser, the lighting of the next tube in the tens order. Assuming for instance, that the 9 tube in the tens order was lighted, when it is extinguished upon the charging of the condenser 176, it will cause via the condenser 113T the lighting of the 0 tube of the tens order in the same manner as the extinguishing of the 9 tube in the units order caused via condenser 113, the lighting of the 0 tube upon the receipt of a pulse.

The input of pulses into the units order may now continue until the 0 tube of the units order is again caused to operate. The condenser 176 will again be charged and causes the application of a pulse to the tens order, which will extinguish the 0 tube and light the 1 tube of the tens order. The operation may thus be continued indefinitely, one tube after the other in the tens decade being lighted as the ring of ten tubes in the units order is completely operated.

Similarly, the tens order is connected via a rectifier 177 and a condenser 178 with the hundreds order. However, the connection differs slightly from the one between the units and the tens orders. Whereas the units order is connected with the ground conductor 101T of the tens order, the 0 tube of the tens order is connected with the high potential conductor 100H of the hundreds order. If the connection from the tens to the hundreds order were also to the negative bus 101H, then the pulse applied from the units to the tens order would operate also the hundreds order.

When the 0 tube of the tens order operates, that is to say, after the tens order has counted 10 complete operations of the units decade, a pulse is applied to the hundreds order. Whichever tube of the hundreds order happens to be lighted when the pulse is applied, will be extinguished upon the charging of condenser 178 and will cause via its associated condenser the lighting of the next tube of the hundreds order. For instance, if the 9 tube was operated in the hundreds order, then it, via its condenser 113H, will apply a voltage to the 0 tube of the hundreds order, which will light. The next pulse will light the 1 tube of the hundreds order, all in the same manner as previously described.

Referring to Fig. 1*a*, voltage at A, the double pulse occurring when one tube (0) extinguishes and the next tube (1) lights, must be transmitted from the 0 tube of one order to the next higher order. In order to prevent the production of two pulses in the link between two orders or counters, condenser 176 (Fig. 13) linking two orders, must be large enough to prevent that during the time interval that occurs, more than a single pulse be transferred.

The function of the rectifiers in the transfer circuits between adjacent orders, such as rectifier 175 (Fig. 13) will now be explained. If no rectifiers were provided and condenser 176 were connected directly to resistor 103, then when condenser 110 discharges it would reduce the voltage of the bus 101T to a negative value whereby all ten tubes of the tens order would become lighted since the voltage across them would be raised to more than 75 volts. Rectifier 177 in the link between the tens and hundreds orders must be poled in a direction opposite to that of rectifier 175, because the transfer connection is not with the negative but with the positive bus 100H of the hundreds order and, therefore, the addition of positive voltage from the conductor 100T to the conductor 100H must be prevented.

In Fig. 13 the pulses are applied to the units order by means of a switching arrangement like the one shown in Fig. 9. Obviously the arrangements of Figs. 8 or 10–12 or any other scheme may be used for entering pulses into the units order.

A composite adding system including resetting and predetermining, as illustrated in Figs. 14–14*b*, will now be described. In order to avoid confusion with the other figures new reference numerals will be employed although it will be clear from a study of the previously described drawings that in many respects the teachings of the other figures are employed in this composite system.

Three orders are illustrated; units, tens and hundreds. Not all the ten tubes, but only tubes 0, 1, 2, 7, 8, 9 of each order are illustrated, it being understood that tubes 3, 4, 5, 6 will be connected between tubes 2 and 7 in a manner that will be apparent from the connection shown in Fig. 7. Positive potential is applied to the system via bus bar 200, and negative potential via bus bar 201. Direct current at suitable potential is supplied to the bus bar from a 60 cycle 115 volt source 202, via the usual rectifier and smoothing or filtering system designated by the general reference numeral 203.

It is assumed that at the output terminal of the source 203 there will appear a potential of 150 volts across the buses 200 and 201. The bus 200 is connected with the tubes of the various orders via branches 200U, 200T and 200H. The bus 201 is connected via a resistor 204, a conductor 205, contacts of a normally closed zero reset key 206 with the individual negative bus bars 201H, 201T and 201U of the tubes in the hundreds, tens and units orders.

It will be noted that the negative bus bar 201 is connected over resistor 204 and via the conductor 205 with the 0 tubes of the three orders directly rather than through the zero reset key 206 as traced for tubes 1–9 of each order. The purpose of this is to permit the resetting of the three orders to zero simply by depressing the key 206 and thus disconnecting the conductor 205 from the branches 201H, 201T and 201U, while the negative potential remains applied directly to the 0 tubes. When, therefore, the key 206 is depressed, the full potential that exists between conductors 200 and 201 will be applied across the 0 tubes of the three orders. The lighting of the three 0 tubes indicates that the device has been reset to 0. Any other tube that may have been lighted during previous operations in any one of the orders will be extinguished since its negative conductor 201 will be disconnected from the current source.

In Figs. 1–12 the counter may be reset to zero by interrupting the connection to the current source but no specific means for accomplishing this are shown. In the arrangement shown in Fig. 13 in which the 0 tube of each order responds to lower voltage than any of the other tubes, the 0 tube in each order will light when the connection with the negative lead to the current source is momentarily interrupted, because tubes 0 have a lower starting potential than the other tubes, whereby the reconnection of the order to the current source will result in the lighting of the 0 tubes not of any other tube.

Turning now to Fig. 14*a*, each order is provided with a thyratron or some other suitable repeater or amplifier for controlling the entering of pulses. The thyratrons are shown at 207 for the units order, 208 for the tens order, and 209 for the hundreds order. The positive input pulse is applied to the grid circuit 210 of the thyratron 207 of the units order. The thyratron 207 will repeat the pulses received by it and will thus cause the successive operation of the tubes within the units order. When the 0 tube of the units order is operated, then a pulse will be applied via the conductor 216 to the input or grid circuit of the thyratron 208 of the tens order to operate the tens order in the manner previously explained.

Upon each complete operation of the units ring of tubes one pulse will be transferred to the tens order via the thyratron 208. Similarly, upon each complete operation of the tens ring, one pulse will be transferred via conductor 217 to thyratron 209 controlling the operation of the hundreds order, all in the manner previously clearly explained.

Preset keys 218, 219 and 220 control the setting of any one of the orders into any numerical position desired. This is accomplished by connecting the positive lead 200 via the resistors 211, 212, conductor 213, key 218, to the grid circuit of thyratron 207. Every impulse applied to thyratron 207 by the depression of the key 218 will send one pulse to the units order and thus light one tube after the other in the units order until the tube is lighted which it is desired to display. Similarly, in the tens order any one of the tubes may be lighted by operating the key 219 the required number of times. The hundreds order may be preset into the desired position by operating the key 220 the required number of times, thus delivering the required number of pulses via thyratron 209.

It will be noted that the thyratrons 207, 208 and 209 are provided with the usual connections for negative grid bias which must be overcome by the positive pulse applied via conductor 210 to operate the tube.

Means are provided for predetermining certain operations to take place only in certain positions of the counter. This will be described as applied to a first and a second predetermining stage.

We shall assume that an operation must be performed when the number "278" is manifested by the counter.

A switch 221 associated with the 2 tube of the hundreds order is moved to the right to contact with the terminal point that connects the tube with the common conductor 222. In the tens order switch 223 adjacent the 7 tube is moved to the right into contact with the terminal on the conductor 224. The switch 225 adjacent to the 8 tube in the units order will connect this tube to conductor 226.

When the required number of pulses has been delivered to the counter which will manifest itself in the lighting of the 2 tube in the hundreds, the 7 tube in the tens and the 8 tube in the units order, three thyratrons 227, 228 and 229, the first predetermining thyratrons, will be operated to control the performance of the required operation. This required operation as shown in the drawing is the energization of magnet coil 230, which is in the cathode circuit of the units predetermining thyratron 229. When thyratron 229 becomes conductive the magnet 230 will move its armature 231 to perform the required operation.

Returning to the highest order first predetermining thyratron 227, it will be noted that its control grid has a permanent negative potential via the negative conductor 201. This negative potential will bias the thyratron 227 against operation until a positive potential is applied to its control grid via condenser 232. Besides the cathode of thyratron 227 is connected via resistors 234, 240 to the positive conductor 200, thus magnifying the negative potential on the grid.

The triggering positive potential is applied to the grid circuit of thyratron 227 by virtue of the increase in potential produced in the lead of the 2 tube when the condenser 242 linking the 1 and 2 tubes order discharges, and causes the operation of the 2 tube. The point of connection of condenser 242 with the lead of the 2 tube was below zero to begin with, but when the condenser 242 discharged, the potential at this connection point rises to zero and in this rise a positive potential is produced which is conveyed via the contact 221 to the conductor 222 and condenser 232 to trigger the thyratron 227 into operation.

The thyratron 227 applies through its cathode resistor 234, conductor 235 and resistors 236, a positive potential to the grid of the tens first predetermining thyratron 228. This grid is normally negative with respect to its cathode because the cathode of 228 is connected via resistors 237, 238, with the positive conductor 200. The positive conductor 200 is connected via the resistors 211, 212, 239, 240, conductor 235 and resistors 236 with the grid of thyratron 228. This will produce sufficient normal biasing potential to prevent the operation of thyratron 228. The application of the positive potential from the cathode of thyratron 227 via the resistor 234, conductor 235 and resistors 236 will make the biasing potential somewhat more positive than it was before, but it will not make it positive enough to permit the operation of the thyratron.

The final triggering of the thyratron awaits an additional positive potential via condenser 241 and conductor 224. This will happen when the tens tube 7 is lighted and raises the potential at 223.

Similarly in the units order the thyratron 229 will be triggered into operation when a positive potential is applied to its grid via a condenser 245, conductor 226, the switch 225. This will happen when condenser 246 discharges and the potential at the point of connection of this condenser with the 8 tube is raised from a minus value towards zero value.

In connection with the operation of the predetermining thyratrons, attention is again called to Fig. 1*a* showing the changes in the relative potential values. The second pip in the pulse does not affect thyratrons 227—229 which remain operated until a predetermining reset key 263 (Fig. 14*a*) is operated and disconnects these tubes from the positive bus 200.

A second predetermining operation (Fig. 14*b*) may be accomplished by means of three thyratrons, 247 for the hundreds, 248 for tens and 249 for the units order. The thyratrons are interconnected in the same manner as the first predetermining thyratrons 227, 228 and 229. Thyratron 247 is connected with the negative bus 201 in the same manner as the first predetermining thyratron 227. The control grid is connected via a condenser 250 and a conductor 251 with switch points which are accessible to switches appearing to the right of conductor 251 adjacent to each tube. Let us assume that it is desired to make the second predetermining operation become effective when "777" is manifested.

The switch 252 adjacent tube 7 (Fig. 14) will be actuated to connect the conductor 251 with the lead joining the 7 tube with the 201H conductor so that in the manner described for the first predetermining operation when tube 7 is lighted a positive potential will be applied to the grid circuit of the second predetermining thyratron 247 to cause its operation. This will lower the potential on the input circuit of the tens second predetermining thyratron 248 sufficiently to prepare thyratron 248 for operation when it receives a pulse via condenser 253 and conductor 254. This will happen when the 7 tube in the tens order is operated and positive potential is applied via the operated switch 255 to the common conductor. In the units order the thyratron 249 will receive a positive pulse via the condenser 256 and conductor 257 when the units 7 tube operates and a positive potential is received via the closed switch 258.

The hundreds 0 tube has a second predetermining switch 259 which connects the conductors 251 not with the conductor leading to the 0 tube, as is the case with the second predetermining switches associated with all the other tubes of the hundreds order, but with a conductor 260 leading to the cathode of the first predetermining tube 229 of the units order. Therefore, if the second predetermining number is in the "0" hundreds, the second operation can take effect only after the first predetermining operation, i. e. after the first predetermining units thyratron 229 has operated. When this happens, the positive potential will be applied to the second predetermining hundreds thyratron 247, whereupon the tens second predetermining thyratron 248 will become operable when the predetermined tens tube lights. After this the second predetermining units tube lights and causes the operation of the second predetermining units thyratron 249. The magnet 261 in the cathode circuit of 249 will now move its armature 262 and perform the required second operation.

Fig. 15 shows an alternative method of obtaining negative grid bias for the predetermined thyratrons. This method is preferred to the one shown in Fig. 14*a* because it permits the cathode potential to remain low relative to the heater element in the tube. Only two thyratrons 300, 301 are shown by way of example but it will be obvious that this manner of coupling and preconditioning thyratrons may be repeated as often as necessary. The cathodes of both thyratrons are connected to ground through resistors 302 and 303, respectively. Resistors 304, 305 are current limiting resistors to prevent excessive grid current when the thyratrons are fired. Resistor 306 keeps the grid of its respective tube negative by virtue of its connection to a bleeder resistance 307 connected between the ground bus and the B— source of voltage. A positive pulse over conductor 308 overcomes the negative bias and permits thyratron 300 to fire. Resistors 309 and 310 act as a bleeder across the ground bus and the B— bus. Their common connection at point 311 is the source of the B— bias for thyratron 301. No incoming pulses over conductor 312 should fire thyratron 301 until thyratron 300 has fired. This is accomplished by having the source of B— potential of sufficient magnitude to keep the second thyratron (301) biased beyond the magnitude of the incoming positive pulses over 312. When the first thyratron is in operation, there is a voltage drop over 302 which raises the point 311 to some value just below the firing potential of the second thyratron, thus permitting incoming pulses over 312 to fire the second thyratron.

Turning now to Figs. 16, 16*a* a composite system of subtracting as well as adding is shown.

The first predetermining means comprising three thyratrons (Fig. 16*a*) 266H, T and U as well as the second predetermining means similarly comprising three thyratrons 271H, T and U are not permanently connected via switches with the tubes of the three orders, but may be connected with them by means of plugs 265H, T, U and 270H, T, U, cooperating with jacks like 268, 269 (Fig. 16). Plug 265H connects the input grid of thyratron 266H via a condenser 267 with any one of the tubes in the hundreds order when inserted into any of the jacks for instance, the jack 268 shown adjacent to the 2 tube. 269 also connected with the hundreds tube 2 is the second predetermining jack into which plug 270H may be inserted. The jacks appearing adjacent the tubes in the other orders receive plugs 266T and U and 270T and U.

The changing from addition to subtraction is accomplished by switching the inter-tube condensers from the configuration illustrated in Fig. 1 into the configuration of Fig. 2. The switches in the units order are at 272, 273, 274, 275, 276 and 277. Similar switches are provided in the tens and hundreds orders.

When the switches are in the position shown, the device will be adding. When it is desired to subtract, all the switches are simultaneously moved into the second position, shown open in the drawing. Thus, the inter-tube condensers will be switched from the configuration of Fig. 1 into that of Fig. 2.

For instance, for adding, condenser 291 is connected between the 0 and 1 units tubes via switch 273. The right-hand electrodes of tubes 0 and 1 are connected with the condenser and with the positive bus 292, tubes 0 via resistor 284 and tube 1 via rectifier 293. This is the configuration of Fig. 1.

When switch 273 is operated, condenser 291 will be connected from a point between the rectifier 293 and tube 1 to a point between tube 2 and resistor 293 on the positive side. The negative side of the tubes will have condenser 295 connected between tube 0 and rectifier 296, and tube 1 and resistor 297.

In Fig. 16*a* as in Fig. 14*a* each order has an input thyratron, 278 for the units, 279 for the tens and 280 for the hundreds. Thyratron 278 is connected in substantially the same manner as thyratron 207 in Fig. 14*a* and receives the input impulses. Thyratrons 279 and 280 have switches 281 and 282 which are left in the positions shown when it is desired to add and are moved into the second position when it is desired to subtract. Condenser 283 connects in the adding position switch 281 of the tens order with tube 0 of the units order. This condenser and resistor 284 must be large enough to absorb the double pips and not convey them to thyratron 279.

For subtracting, switch 281 is in the second position to connect a small condenser 285 with the grid circuit of thyratron 279. This condenser is connected via leads 286 with the 9 units tube and zero reset key 299 via rectifier 287 with the zero potential bus 298. No double pip will be produced in this branch and therefore, a single pulse will be received by thyratron 279.

In the position shown in the drawing, switch 282 connects the grid circuit of thyratron 280 via a large condenser 288 and a conductor 289 with the 0 tens tube. This tube is connected via a resistor 290 with the lead 298. Condenser 288 is large enough to absorb the double pips and to permit the delivery of only one pulse to thyratron 280. In all other respects, Figs. 16, 16*a* are like Figs. 14–14*b*.

While several embodiments of the invention have been here shown and described, other variations will be suggested to those skilled in the art. It is, therefore, not intended to limit the invention to the embodimens here shown and described, but only by the scope of the appended claims.

What I claim is:

1. In an impulse counting device, a source of electrical potential, a plurality of digit manifesting units connected with said source, each of said units comprising at least two impedances and a discharge device, at least one of said impedances including a unidirectional device, an impulse transferring means linking each unit to an adjacent unit, and means for producing a change in the potential applied to said units for each impulse to be counted.

2. The device according to claim 1, and in which one of said impedances is a resistor.

3. The device according to claim 1, and in which the discharge device is a diode.

4. The device according to claim 1, and in which the impulse transferring means is a condenser.

5. In an impulse counting device, a source of electrical potential, a plurality of digit manifesting units connected with said source, each of said units comprising two impedances and a diode between them connected with said source, at least one of said impedances including a unidirectional device, an impulse transferring means linking each unit to both adjacent units, and means for producing a change in the potential applied to said units for each impulse to be counted.

6. The device according to claim 5, and in which said means for producing a change in the potential comprise a multi-electrode tube connected in parallel to said source and to said units.

7. The device according to claim 5, and in which said means for producing a change in the potential comprise at least two diodes connected in series to said source of potential.

8. In an impulse counting device, a source of electrical potential, a plurality of digit manifesting units connected with said source, each of said units comprising a first and a second impedance and a diode, a first impulse transferring means connected to the diode and the first impedance of one unit and to the diode and second impedance of one adjacent unit, a second impulse transferring means connected to the diode and the second impedance of said one unit and to the diode and second impedance of another adjacent unit, and means for producing a change in the potential applied to said units for each impulse to be counted.

9. The device according to claim 8, and in which the units are interconnected in a ring, the first impedance is a resistor and the second impedance a rectifier.

10. The device according to claim 8, and in which the impulse transferring means are condensers.

11. The device according to claim 10, and means for switching each condenser from one unit to another.

12. In an impulse counting device, a source of electrical potential, a plurality of digit manifesting units connected with said source, each of said units comprising a diode and two unidirectional devices, an impulse transferring means linking each unit to both adjacent units, and means for producing a change in the potential applied to said unit for each impulse to be counted.

13. The device according to claim 12, and resistors for bridging said unidirectional devices.

14. The device according to claim 12, and a resistor bridging each unidirectional device.

15. The device according to claim 12, resistors and means for alternately connecting resistors to bridge one or another unidirectional device in each unit.

16. In an impulse counting device, a source of potential, a plurality of digit counting units, each having bridged across said source in series an impedance, a diode and a unidirectional device, the unidirectional devices of adjacent units being connected to different poles of the source, a condenser connected to each electrode of each diode linking it to both adjacent units, and means for producing a change in the potential applied to said units for each impulse to be counted.

17. In an impulse counting device, a source of potential, a plurality of digit counting units bridged across said source, each of said units comprising a first pair of impedances connected in parallel to one pole of said source, a second pair of impedances connected in parallel to the other pole of said source and a diode connected between said first and second pairs, an impulse transferring means linking each unit to both adjacent units, and means for producing a change in the potential applied to said units for each impulse to be counted.

18. In an impulse counting device, a source of potential, a plurality of digit counting units, each having bridged across said source in series a resistor, a diode and a rectifier, the rectifiers of adjacent units being connected to different poles of the source, a condenser connected to each electrode of each diode linking it to both adjacent units, and means bridged across said source for producing a change in the potential applied to said units for each impulse to be counted.

19. In an impulse counting device, a source of electrical potential, a plurality of digit manifesting units bridged across said source and each comprising in series a diode, a first rectifier between the diode and one pole of the source and an oppositely poled second rectifier between the diode and the other pole of the source, a condenser connected to each electrode of each diode linking it to both adjacent units, and means for bridging each rectifier.

20. The device according to claim 19, and in which the means for bridging the rectifiers comprises a switch operable at will to bridge only one rectifier in each unit.

21. The device according to claim 20, and in which the switch has an impedance connected in series therewith alternately to bridge it across the rectifiers in the adjacent units.

22. In an impulse counting device, a source of electrical potential, a plurality of digit manifesting units bridged across said source and each comprising in series a diode, a first rectifier between the diode and one pole of the source and an oppositely poled second rectifier between the diode and the other pole of the source, a condenser connected to each electrode of each diode linking it to both adjacent units, a switch for each unit and its adjacent unit, and means controlled by the switches for bridging either rectifier associated therewith.

23. The device according to claim 22, and in which each switch has a resistor connected in series therewith alternately to bridge it across the associated rectifiers.

24. In an impulse counting device, a source of electrical potential, a plurality of digit manifesting units bridged across said source and each comprising in series a diode, a first pair of oppositely poled rectifiers between the diode and one pole of the source and a similarly poled second pair of rectifiers between the diode and the other pole of the source, a resistor bridged across the rectifier in each pair which is nearest the diode, a condenser connected to each electrode of each diole linking it to both adjacent units, a third pair of oppositely poled rectifiers in series bridging each condenser, a connection between said other pole of the source and a point between the third pair of rectifiers on one side of each unit, and a connection between said one pole of the source and a point between the third pair of rectifiers on the other side of each unit.

25. The device according to claim 24, and in which the first pairs of rectifiers of adjacent units connect the diodes of the units to different poles of the source.

26. The device according to claim 24, and in which the second pairs of rectifiers of adjacent units connect the diodes of the units to different poles of the source.

27. In an impulse counting device, a source of electrical potential, a plurality of digit manifesting units bridged across said source and each comprising in series a diode, a first impedance between the diode and one pole of the source and a second impedance between the diode and the other pole of the source, a condenser connected to the first impedance of each unit, and a switch for alternately connecting the condensers to the second impedances of adjacent units.

28. In an impulse counting device, a source of electrical potential, a plurality of digit manifesting units bridged across said source and each comprising in series a diode, a rectifier between the diode and one pole of the source and a resistor between the diode and the other pole of the source, a condenser connected to the rectifier of each unit, and a switch for alternately connecting the condensers to the resistors of the adjacent units.

29. A counting circuit comprising in combination: a direct voltage supply having positive and negative terminals; means responsive to input pulses to reduce the voltage of said voltage supply; a plurality of gas discharge tube circuits connected in parallel, each alternate circuit comprising a resistance having one terminal connected to the positive terminal of the voltage supply, a rectifier having a negative electrode connected to the negative terminal of the voltage supply, and a gas discharge tube connected between the other terminal of the resistance and the positive terminal of the rectifier, each other alternate circuit comprising a rectifier having a positive electrode connected to the positive terminal of the voltage supply, a resistance having one terminal connected to the negative terminal of the voltage supply, and a gas discharge tube connected between the other terminal of the resistance and the negative terminal of the rectifier; and condensers connecting the junction point of the gas discharge tube and the resistor of each said circuit to the junction point of the gas discharge tube and the rectifier of the following circuit.

30. A scaler stage comprising, in combination, an even number of cascaded gas discharge tube circuits each consisting of a discharge tube connected between a resistor and a rectifier, a condenser connecting the junction of the tube and the resistor of each circuit to the junction of the tube and the rectifier of the next succeeding circuit, the last circuit being so connected to the first, a voltage supply having a positive terminal connected to the positive electrode of the rectifier of alternate circuits and to the resistor of the other alternate circuits and a negative terminal connected to the resistor of the first said alternate circuits and to the negative terminal of the rectifier of said other alternate circuits, said voltage supply being greater than the extinction potential of the discharge tubes, and means responsive to input pulses to reduce the voltage of said voltage supply during said input pulses to a value less than the extinction potential of the discharge tubes.

31. A counting circuit for electrical impulses comprising at least a pair of electrical networks, each of said pairs including first and second glow tubes each having an anode and a cathode, a first rectifier having its cathode connected to said first glow tube anode, a second rectifier having its anode connected to said second glow tube cathode, a first resistor connected between said first glow tube cathode and said second rectifier cathode, a second resistor connected between said second glow tube anode and said first rectifier anode, and a condenser connected between the cathodes of said first and second glow tubes; a plurality of coupling condensers, each one of said coupling condensers being connected between a second tube anode of one of said electrical networks and a first tube anode of a subsequent one of said electrical networks, a resistor having one end coupled to all of said first rectifier anodes, and means coupling all of said second rectifier cathodes together, said resistor and said means providing an input upon which pulses to be counted are impressed.

32. A counting circuit for electrical impulses comprising at least a pair of glow discharge tubes each having a cathode and an anode, a first resistor having one end connected to both said tube anodes, a condenser connected between said tubes' cathodes, a second resistor having one end connected to one of said pair of tubes' cathodes, a rectifier connected between the cathode of the other of said pair of tubes and the other end of said second resistor to form a junction and means to apply electrical impulses to be counted to said first resistor and said junction.

References Cited in the file of this patent

UNITED STATES PATENTS

| | | |
|---|---|---|
| 2,401,621 | Desch et al. | June 4, 1946 |
| 2,426,278 | Mumma | Aug. 26, 1947 |
| 2,426,279 | Mumma | Aug. 26, 1947 |
| 2,442,428 | Mumma | June 1, 1948 |
| 2,541,041 | Crenshaw | Feb. 13, 1951 |
| 2,549,779 | Crenshaw | Apr. 24, 1951 |
| 2,646,534 | Manley | July 21, 1953 |